United States Patent [19]
Taguchi et al.

[11] Patent Number: 4,518,839
[45] Date of Patent: May 21, 1985

[54] HIGH FREQUENCY HEATING APPARATUS WITH WIRELESS TEMPERATURE PROBE

[75] Inventors: Shunichi Taguchi; Shuji Ohkawa; Mitsuru Watanabe, all of Yokohama; Itsuo Kikuchi, Ibaraki, all of Japan

[73] Assignee: Hitachi Heating Appliances Co., Ltd., Chiba, Japan

[21] Appl. No.: 471,433

[22] Filed: Mar. 2, 1983

[30] Foreign Application Priority Data

Mar. 3, 1982 [JP] Japan .................. 57-33242
Jul. 7, 1982 [JP] Japan ................ 57-118003
Sep. 7, 1982 [JP] Japan ................ 57-155704
Sep. 7, 1982 [JP] Japan ................ 57-155705

[51] Int. Cl.³ .............................................. H05B 6/68
[52] U.S. Cl. ................... 219/10.55 B; 219/10.55 E; 219/10.55 R; 99/421 TP; 340/870.17; 340/870.26; 340/592; 374/155; 374/149
[58] Field of Search ............... 219/10.55 B, 10.55 E, 219/10.55 R, 494, 510, 516; 99/421 TP, 325; 340/870.17, 870.18, 870.26, 870.3, 870.37, 870.38, 592, 593; 374/155, 149

[56] References Cited

U.S. PATENT DOCUMENTS 3,878,502 4/1975 Rochelle ............... 340/870.17
4,249,418 2/1981 Ebata .................. 340/870.26
4,340,796 7/1982 Yamaguchi et al. ...... 219/10.55 B
4,381,439 4/1983 Miyazawa et al. ....... 219/10.55 E X

FOREIGN PATENT DOCUMENTS 2917214 11/1979 Fed. Rep. of Germany ... 219/10.55 B
53-64847 6/1978 Japan .................. 219/10.55 B
53-66034 6/1978 Japan .................. 219/10.55 B
53-113346 10/1978 Japan .................. 219/10.55 B
54-44244 4/1979 Japan .................. 219/10.55 B
54-44245 4/1979 Japan .................. 219/10.55 B Primary Examiner—Philip H. Leung
Attorney, Agent, or Firm—Antonelli, Terry & Wands

[57] ABSTRACT

A novel high frequency heating apparatus for detecting the internal temperature of an object contained in a heating chamber and controlling the heating thereof is disclosed, in which the temperature change of the object is picked up as a change of the resistance value of a thermistor. The resistance change is converted into a change of the oscillation frequency of an oscillator and transmitted with the ultrasonic wave as a medium. The power supply for the transmitter circuit is provided in such a manner that the high frequency filled in the heating chamber for heating the object is received by an antenna and rectified by a diode. At the receiving end, this ultrasonic wave is picked up as a temperature signal of the object, and processed by a microcomputer, so that the temperature of the object is detected for heating control.

22 Claims, 54 Drawing Figures

FIG. 9
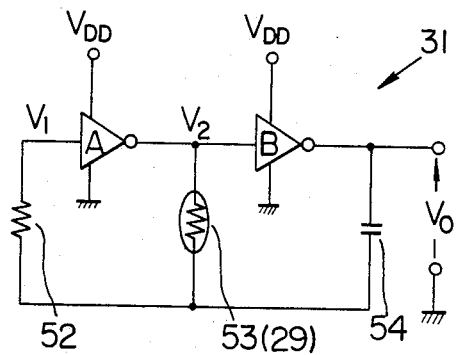
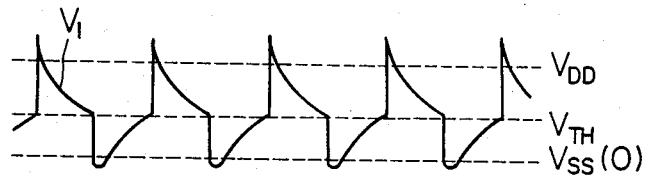
FIG.10a
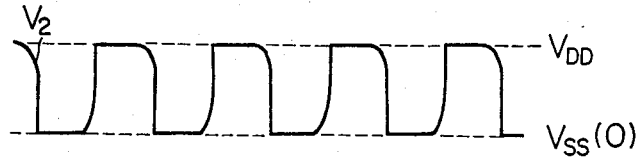
FIG.10b
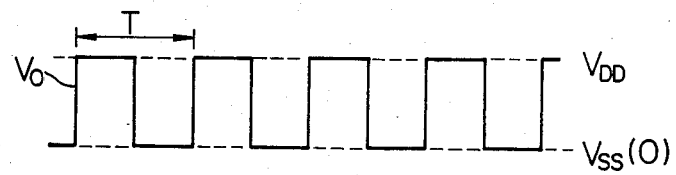
FIG.10c

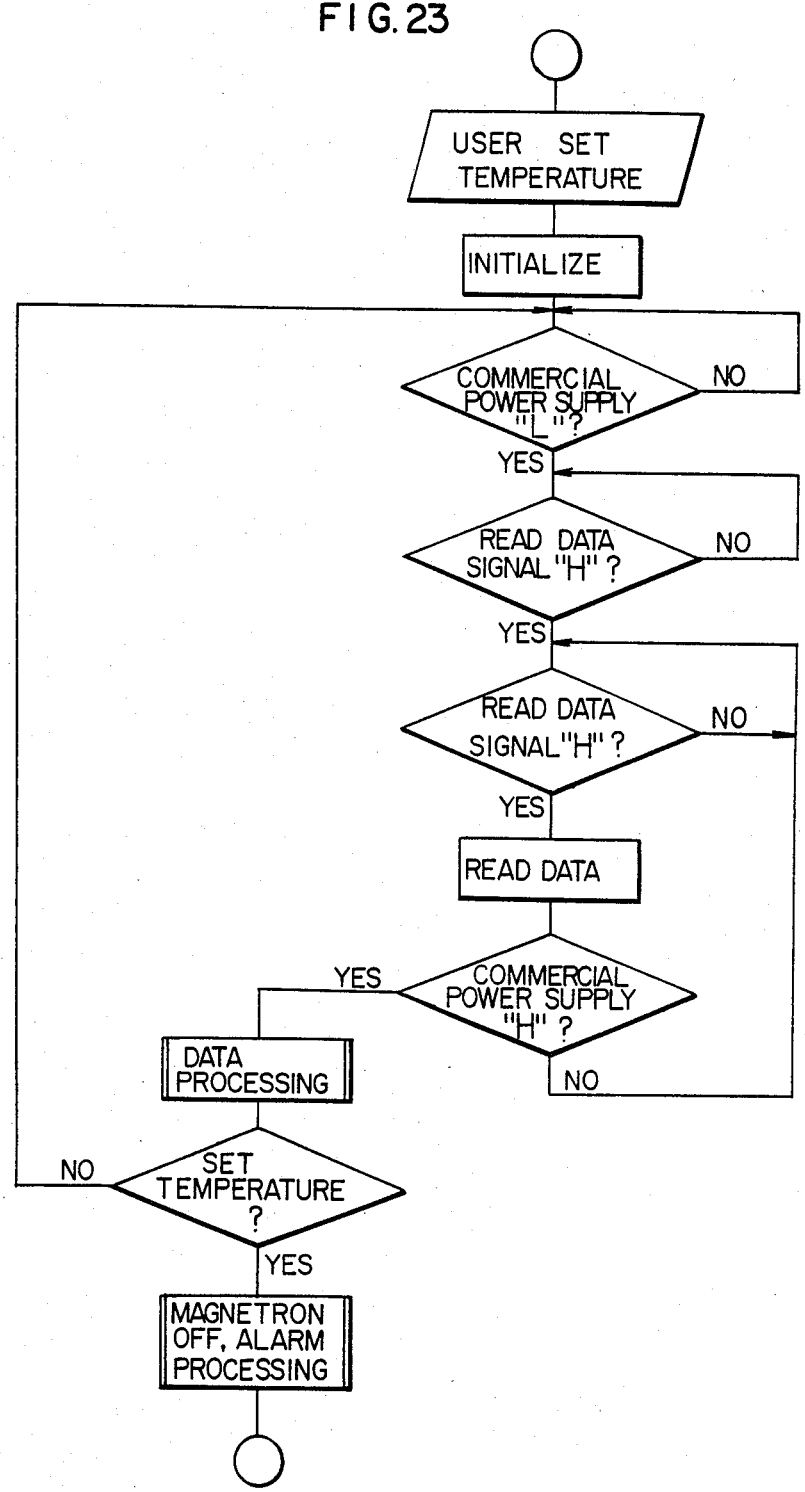

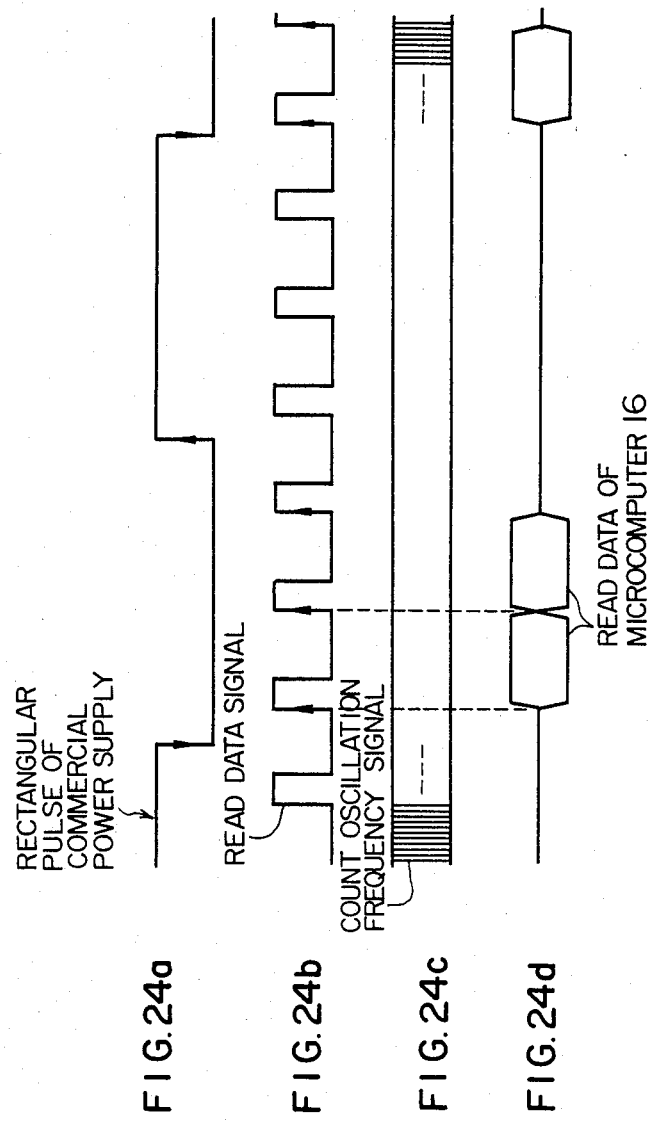

FIG. 25a
FIG. 25b
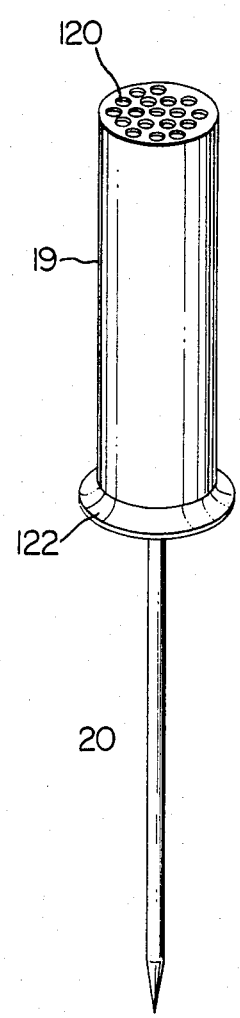
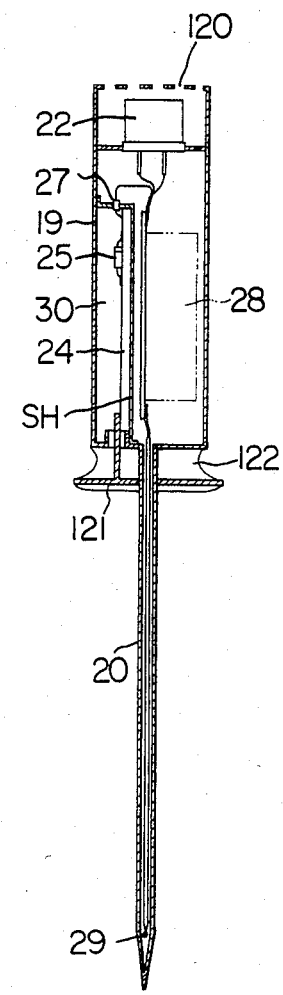
9

HIGH FREQUENCY HEATING APPARATUS WITH WIRELESS TEMPERATURE PROBE

The present invention relates to a high frequency heating apparatus in which a temperature signal of an object to be heated is transmitted in wireless manner by a transmitter and received at the receiving side for automatically controlling the heating and cooking of the object.

FIG. 9 is a diagram showing an embodiment of a probe oscillator circuit;

FIGS. 10a, 10b and 10c show voltage waveforms generated at various points in FIG. 9;

FIG. 23 is a general flowchart for reading and processing the temperature data by microcomputer;

FIGS. 24a, 24b, 24c and 24d are time charts for FIG. 22;

FIGS. 25a and 25b are an outside view and a sectional view respectively of another embodiment of the body of the probe;

In a conventional high frequency heating apparatus, the heating control is automated in such a manner that the heat, steam or gas generated from the object to be heated is detected by a thermistor, humidity sensor or gas sensor respectively thereby to detect the finished conditions of the object. Another type of conventional high frequency heating apparatus uses an infrared ray sensor by which the surface temperature of an object to be heated is measured to detect the finished conditions of the object for the purpose of automatic control.

In all these types of high frequency heating apparatuses, the sensors are disposed outside of the heating chamber distant from the object to be heated, in order not to be affected by the high frequency or the like, resulting in high operability for cooking. In view of the fact that the temperature, humidity and the gas of the environment in the heating chamber are detected, however, the finished conditions are varied, the temperature difference between the surface and inner portion of the object is conspicuous due to the variations of the detecting accuracy caused by repetitive heating or the difference in the amount of the objects, so that a fine temperature control of the object is difficult. Especially in the case of the apparatus using infrared ray sensor among these types, a detectable region or field is so narrow that detection outside the field is impossible, thereby posing a limitation on the position of the object or the type or form of the vessel. An apparatus of wired type for solving these problems has been suggested in which a probe containing a thermistor is inserted into the object to be heated and the temperature data obtained is collected through cable to effect heating control.

Figure 1:
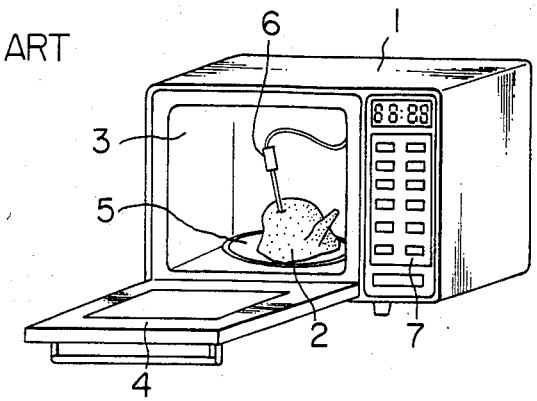
FIG. 1 is an outside view of a conventional high-frequency heating apparatus having a probe of cable type.

The last-mentioned apparatus is shown in FIG. 1. In FIG. 1, the user opens the door 4 of a high frequency heating apparatus 1, disposes an object to be heated 2 on the pan 5 in the heating chamber 3, inserts the cable plug into the jack of the oven, and then inserts a probe 6 into the object 2. He closes the door 4, sets the temperature at a desired point on a control panel 7, and depresses the start button. A high-frequency wave is radiated in the heating chamber 3 to heat the object 2. The resistance value of the thermistor in the probe 6 changes, and this change is converted into a voltage variation, which is then read and processed by microcomputer or the like, so that the output of the magnetron is adjusted thereby to control the finished conditions of the object 2 to be heated.

The disadvantage of this high-frequency heating apparatus is that the use of cable requires extra labor each time of cooking, making the cooking operation troublesome. In addition, it is impossible to use a turn table which is most effective for uniformly heating the object 2. Further, the cable generally succumbs to heat easily.

The primary object of the present invention is to obviate the above-mentioned disadvantages of the conventional apparatuses and to provide a high frequency heating apparatus in which a temperature signal of an object to be heated is transmitted by a temperature probe in wireless manner without any cable and this signal is received on the body side of the heating chamber thereby to detect the temperature of the object.

In order to achieve this object, the temperature change of the object to be heated is detected as a change of resistance value of a thermistor providing a heat-sensitive element and the resistance value change is converted into a pulse oscillation period. This pulse oscillation period is transmitted with ultrasonic wave as a medium. Further, the drive power supply for the transmitter circuit is obtained by receiving the high frequency in the heating chamber by antenna and rectifying it with a diode.

On the body side of the heating apparatus, punched holes or meshes are provided in part of the wall of the heating chamber, and a receiving element is arranged through these punched holes or meshes thereby to receive signal of the wireless temperature probe. The signal thus received is amplified and rectified to obtain a pulse oscillation period of the probe by use of a comparator circuit or the like. In order to determine this pulse oscillation period, another frequency signal which is higher and more stable than the pulse oscillation is counted so that the resulting count is read into the microcomputer. The microcomputer, in which the relation between temperature and pulse oscillation period is stored in advance, performs the computing process from the count read in for detecting the temperature of the object to be heated.

The body of the wireless probe is comprised of a conductor plate of metal or the like for protecting the heat-sensitive element and the transmitter circuit from the strong electric field and high frequency.

Figure 2:
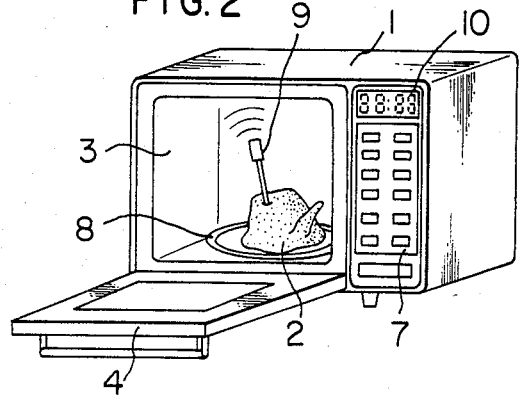
FIG. 2 is an outside view of a high-frequency heating apparatus with wireless probe according to an embodiment of the present invention.

An embodiment of the present invention will be explained with reference to the drawings. FIG. 2 shows a general perspective view of a high frequency heating apparatus using a wireless temperature probe according to the present invention. This apparatus uses a turn table which is most effective for uniformly heating the object as mentioned above and has a workability superior to the probe using cable.

In FIG. 2, the processes and sequence of operation will be described.

(1) First, the door 4 is opened, and an object to be heated 2 is disposed on the turn table 8. A wireless temperature probe 9 is inserted into the object and the door 4 is closed.

(2) A desired temperature is set on a control panel 7, and a start button is depressed.

(3) High frequency wave is radiated in the heating chamber 3, so that the object 2 is heated and temperature data is transmitted from the wireless temperature probe 9.

(4) When the set temperature comes to coincide with the value of the temperature data, a control circuit is actuated and a power circuit is turned off, thus completing the cooking.

In this way, the object is heated uniformly, and since the internal temperature of the object is detected to control the oscillation of high frequency, the cooking operation is greatly simplified.

For realizing this wireless temperature probe, it is necessary to solve two difficult problems.

(1) How the temperature signal is transmitted to the body of the heating apparatus.
(2) The probe is supplied with power from what for transmitting the temperature signal.

A conceivable medium for transmitting the temperature signal may include light, radio wave or ultrasonic wave.

If light is used, the attenuation of the signal caused by the contamination of the light-transmitting and light-receiving sections poses a practical problem. When a light-emitting diode is used, meshes or the like are required for protecting the element from the intense electric field of high frequency in the heating chamber, thus making it more difficult to clean the contamination.

In the case of radio wave, on the other hand, an antenna for transmission and receiving is required. This reduces the effective area in the heating chamber.

The use of ultrasonic wave as a transmission medium reduces these problems as will be described in detail later.

A battery is used most simply as a power supply for the temperature probe. In this case, the problems are that (1) Battery replacement is troublesome.
(2) A case for containing the battery is required, thus making the probe bulky.
(3) The battery case, if left to stand long with the battery therein, is likely to become corroded.

In view of these problems, part of the high frequency power is taken out from the heating chamber and rectified to obtain the electric wave according to the present invention.

Figure 3:
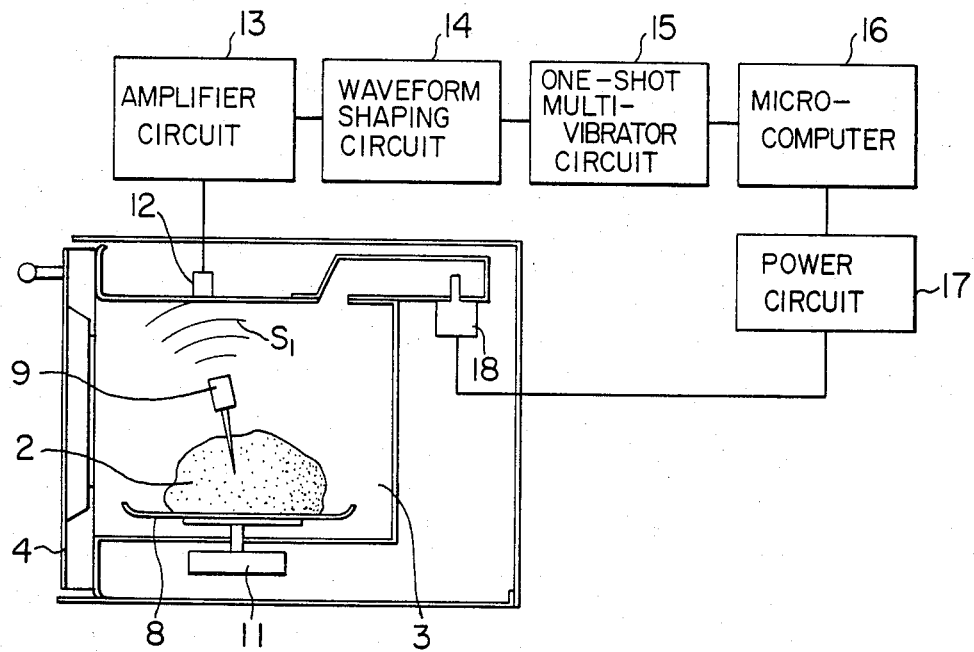
FIG. 3 is a system block diagram of a high-frequency heating apparatus with a wireless probe.

A system block diagram of an apparatus according to the present invention is shown in FIG. 3. First, the operating principle of this system will be described.

The probe 9, which uses a thermistor as a temperature detecting element, picks up the temperature change of the object to be heated as a variation of resistance value of the thermistor, and after converting it into a variation of the oscillation frequency of an oscillator, transmits the frequency variation from an ultrasonic transmitter element by way of ultrasonic wave. The body of the heating apparatus is provided with punched holes or meshes at part of the heating chamber wall through which an ultrasonic wave receiving element is fixedly mounted. The probe 9 transmits a signal of an oscillation period determined by a certain temperature, which signal is received by the receiving element 12. This signal is amplified at an amplifier 13 and waveform-shaped at a waveform shaping circuit 14 thereby to produce an oscillation period of the probe 9. In order to determine this oscillation period, another stable high frequency signal is counted and the resulting count is read into a microcomputer 16. The microcomputer 16, in which the relation between temperature and oscillation period is stored in advance, performs the computing processes from the count thus read, and thus detects the internal temperature of the object at the forward end of the probe. When the temperature of the object reaches a set level, a power circuit 17 of a magnetron 18 is controlled.

Figure 4A:
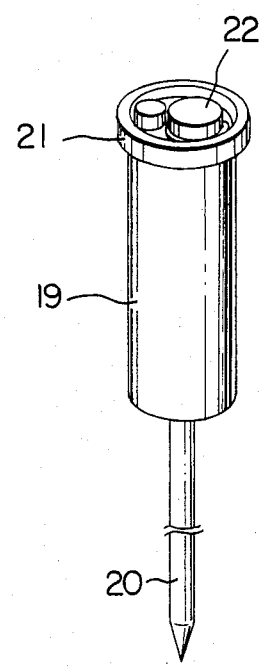
FIGS. 4a and 4b are an outside view and a sectional view respectively of the body of the wireless probe.

An outside view of the wireless temperature probe is shown in FIG. 4a. The probe 9 includes a thermistor providing a temperature detecting element contained therein, a protruded portion 20 to be inserted into the object 2, a section having a power circuit and a circuit for transmitting the temperature signal and a section having an antenna 23 for receiving the high frequency and an ultrasonic transmitter element 22.

Figure 4B:
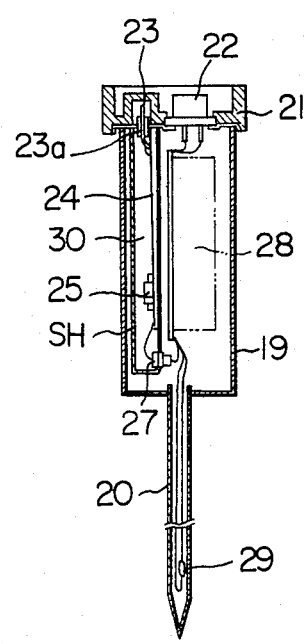

A sectional view of the probe 9 is shown in FIG. 4b. In this construction, numeral 30 designates a power supply. Part of the high frequency power is introduced from the heating chamber 3 by way of a high frequency receiving antenna 23 and then introduced to a strip base plate 24 for the rectifier circuit. The high frequency wave received is led via the strip base plate to the rectifier diode 25 for rectification. The DC power thus rectified is supplied through a feedthrough capacitor 27 to the oscillation and transmission circuits. The power circuit section 30 is shielded by a conductor plate SH such as metal. This is in order to protect the parts or elements of the oscillation and transmission circuits from being damaged or falsely actuated by the high frequency field which is caused on the strip base plate 24 by the high frequency power as high as 1 W conducted by the receiving antenna 23. The feedthrough capacitor 27 functions to remove the high frequency components superimposed on the rectified DC power and thereby to prevent the false actuation of the oscillation or transmission circuit.

The thermistor 29 providing a temperature detecting element is contained in the forward end of the protruded portion of the probe 9 and is connected to the oscillation circuit 28.

The ultrasonic wave transmitter element 22 is of dripproof type and is made of stainless steel resistant to corrosion. The element 22 is sealed by silicon rubber or the like not to be penetrated by water drips from the surroundings where the probe is secured.

The receiving antenna 23 is covered with a heat-resistant plastic 21 to keep the user's hands away from the antenna. The antenna 23 is also sealed around the hole thereof to keep water drips or the like away from the power supply 30.

The vibrator of the ultrasonic wave element 22 is exposed by cutting out the plastic cover 21 to facilitate the cleaning thereof.

In order to protect the internal circuits from the high frequency of intense electric field, the whole probe is encased by a hard-to-rust metal plate of stainless steel and hermetically sealed to keep off water drips or the like.

Figure 5:
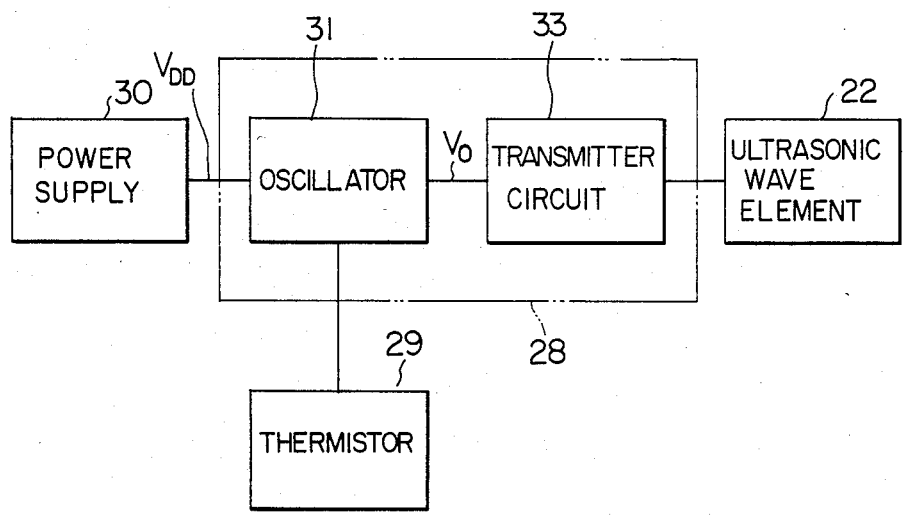
FIG. 5 is a system block diagram of the device shown in FIGS. 4a and 4b.
Figure 6A:
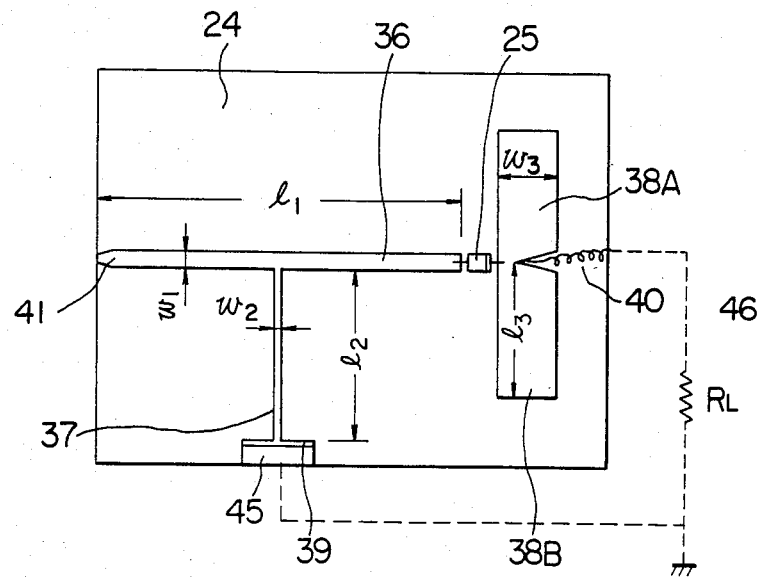
FIGS. 6a and 6b are diagrams showing a strip base plate of a rectifier circuit.
Figure 6B:
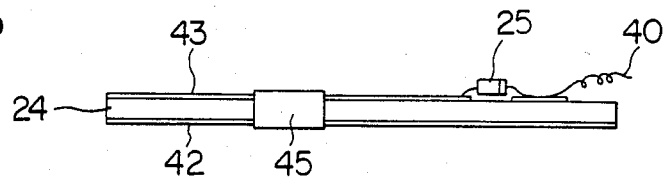

A construction block diagram of this probe is shown in FIG. 5. The portions designated by dashed line in FIG. 5 is the circuit section 28. Numeral 30 designates a power supply section, and numeral 31 an oscillator section, the oscillation frequency of which changes with the resistance value of the thermistor 29. Numeral 33 designates a transmitter circuit for driving the ultrasonic wave element 22 and transmitting a temperature signal. Each block of the construction of the probe will be explained. First, the strip base plate 24 for the rectifier circuit of the power circuit 30 will be described with reference to FIGS. 6a and 6b. The high frequency receiving antenna 23, though not shown in FIGS. 6a and 6b, is mounted at the forward end 41 of the main line. The high frequency power introduced by the main line 36 reaches a rectifying diode 25. If the rectification is to be made efficiently, it is necessary to form a wave-shorting face at the position of the diode 25. This is for the reason that at the wave-shorting face, the high frequency field is minimum with a maximum current, thus making it possible to apply necessary and sufficient current without imposing an excessive reverse voltage on the diode. After the diode, therefore, a pair of the shorting lines 38A and 38B are provided. The length $l_3$ of these lines is selected at $\lambda g/4$ as viewed from the diode 25, where $\lambda g$ is the wavelength of the high frequency on the strip line. Since the forward ends of the shorting lines are open, the impedance as viewed from the diode 25 is shorted. The two shorting lines, which are connected in parallel to each other as viewed from the diode 25, apparently present a lower impedance and thus accurately form a radio wave shorting face at the position of the diode 25.

The direct current obtained by rectification through the diode is applied through a lead wire 40 to a load resistor $R_L$, and through a DC feedback line 37 and the main line 36, into the diode 25 in a DC loop. The DC feedback line 37 is for forming this DC loop which is required to cut off the high frequency power from the main line 36 while at the same time passing the direct current. In order to realize this, the high frequency impedance as viewed from the main line 36 toward the DC feedback line 37 is selected to be an open impedance. Under this condition, the high frequency power is not supplied to the DC feedback line 37 and, as viewed from the main line 36, the DC feedback line 37 appears to be absent in the sense of high frequency.

In order to attain the open impedance, the length $l_2$ of the DC feedback line 37 should be selected at $\lambda g/4$ and the end thereof shorted. In the embodiment of FIGS. 6a and 6b, the shorting is effected in the manner mentioned below. An isle 39 is provided at the end of the DC feedback line 37. This isle 39 is shorted with the ground side 42 of the rectifier circuit strip base plate 29 by a shorting plate 45. The shorting lines 38A and 38B are wider than the DC feedback line 37 for the reason mentioned below.

The characteristic impedance Zo of a strip line is greater, the smaller the width thereof. When the end is open or shorted, the input impedance is given respectively as $$-jZo\cot\left(\frac{2\pi l_3}{\lambda g}\right) \text{ and } jZo\tan\left(\frac{2\pi l_2}{\lambda g}\right).$$

If a shorting impedance is to be obtained, Zo is required to be minimized or the line width must be maximized, while an open impedance is obtained by maximizing the value Zo or by minimizing the line width.

For example, let the thickness of the base plate 35 (the dielectric portion) be 1 mm, the relative dielectric constant be 3.8, and the operating frequency be 2450 MHz. The characteristic impedance Zn takes the value of 50, 102 and 24 $\Omega$ respectively against the widths of $W_1$ of 2.2 mm, $W_2$ of 0.5 mm and $W_3$ of 6.0 mm.

The length $l_1$ of the main line 36 is required to be about $\lambda g/2$. In FIG. 4b, the diameter of the high frequency coupling hole 23a is as small as less than 1/50 of the wavelength of high frequency, and therefore, the impedance as viewed from the forward end 41 of the main line 36 toward the high frequency coupling hole 23a in FIG. 6a is substantially a shorting impedance. If the high frequency introduced on the main line 36 is to efficiently resonate and be efficiently rectified by the diode 25, therefore, it is necessary that $l_1 \cong \lambda g/2$. In FIG. 6a, the dashed line is drawn for convenience's sake for explaining the DC loop, and the feedthrough capacitor is not shown.

Figure 7A:
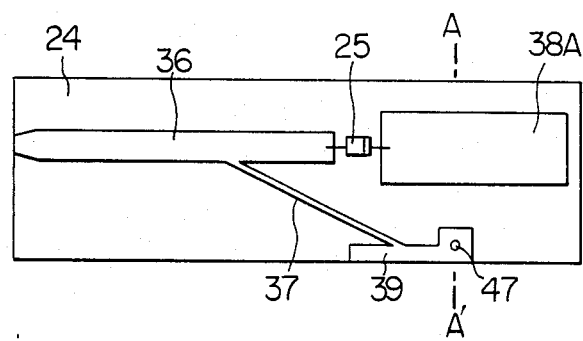
FIGS. 7a and 7b are diagrams showing another embodiment of the strip base plate of the rectifier circuit.
Figure 7B:
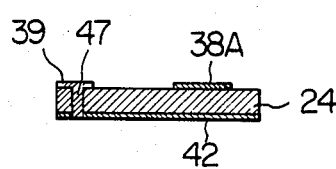

FIGS. 7a and 7b show another embodiment of the strip base plate 24 for the rectifier circuit. In this embodiment, only one shorting line 38A is used for reducing the size of the base plate and the DC feedback line 37 is arranged at an angle to the main line 36. The isle 39 is shorted with the ground side 42 most accurately by use of the above-mentioned shorting plate 45 in the range from low to high frequencies. The use of the shorting plate 45, however, is not so advantageous considering the need of soldering. In the embodiment under consideration, a through hole is provided in the isle 39, by which the isle 39 is shorted with the ground side 42. FIG. 7b is a sectional view taken along A—A' in FIG. 7a.

Figure 8:
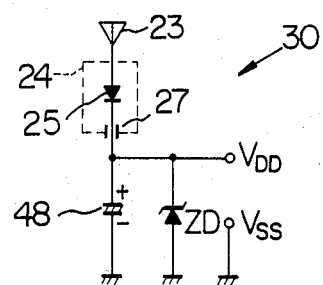
FIG. 8 shows an equivalent circuit of a power circuit.

FIG. 8 shows an equivalent circuit of the power circuit. The DC power supply obtained by the antenna 23, the strip line and the rectifying diode 25 is stored in an electrolytic capacitor 48 of large capacitance thereby to enable the probe circuit to operate even during the half cycle when the high frequency is not radiated. The capacitor 48 is connected in parallel to a Zener diode 47 to prevent the output of a predetermined DC voltage or higher.

Now, the oscillator 31 will be explained.

In the case where the thermistor is used as a temperature-sensing element as mentioned above, various circuits are conceivable for converting the temperature change, namely, the resistance change of the thermistor into the change of oscillation frequency. A circuit using an active element such as an SCR or a transistor, for instance, requires a temperature-compensating thermistor due to the fact that the operating point of the active element fluctuates with the ambient temperature of 0° to 90° C. Complete compensation, however, is difficult, and if possible, the circuit is complicated.

The oscillation circuit according to the present invention has solved this problem, and using integrated circuits having an operating point remaining unchanged against the ambient temperature, the circuit is simplified.

An embodiment of a specific circuit of the oscillator section is shown in FIG. 9. The oscillator circuit, which uses a CMOS inverter low in power consumption, is a circuit utilizing the charge and discharge of an RC. The operating timing of this circuit is given in FIGS. 10a to 10c. The oscillation period T of this oscillator circuit, as shown, is expressed as $$T = k \cdot R_T C_T \qquad (1)$$

where $R_T$ is the resistance value of the resistor 53 (29), $C_T$ is the capacitance of the capacitor 54, and k is a constant which is generally 2.2 to 2.3 depending on the conditions. In this circuit diagram, the resistor 52 is a protection resistor for reducing the current flowing in the input protection diode of the CMOS inverter A. The greater the ratio $R_S \cdot R_T$ between the resistor 52 and the resistor 53 ($R_S$: the resistance value of the resistor 52), the variations of the threshold voltage of the CMOS inverter is absorbed more thereby making the oscillation period more stable. In actual practice, $R_S/R_T$ of about 10 is selected, and in view of the stability of the resistance value of the base plate, $R_S$ of about 200 k$\Omega$ is selected. When the value of about 10 is selected for $R_S/R_T$, the oscillation period remains stable against the fluctuations of the source voltage. If the capacitance of the capacitor 59 is fixed in equation (1), the oscillation period T is proportional to the resistance value $R_T$. In other words, if the resistor 53 is replaced by a thermistor, the oscillation period T changes with temperature.

The input voltage $V_1$ of the inverter takes the waveform as shown in FIG. 10a, where the source voltage of low level (ground level) is $V_{SS}$ and that of high level $V_{DD}$. The waveform of the input voltage $V_1$ changes at the inverter threshold voltage $V_{TH}$, while the waveform of the voltage $V_2$ is rectangle with gentle curve of rise and fall through the inverter A as shown in FIG. 10b. Further, the voltage $V_2$ takes a rectangular form $V_0$ after being shaped at the inverter B.

Figure 11:
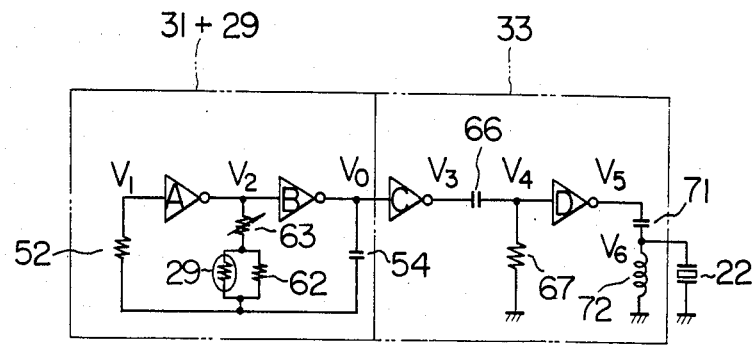
FIG. 11 is a diagram showing an embodiment of a specific circuit of the probe.
Figure 13:
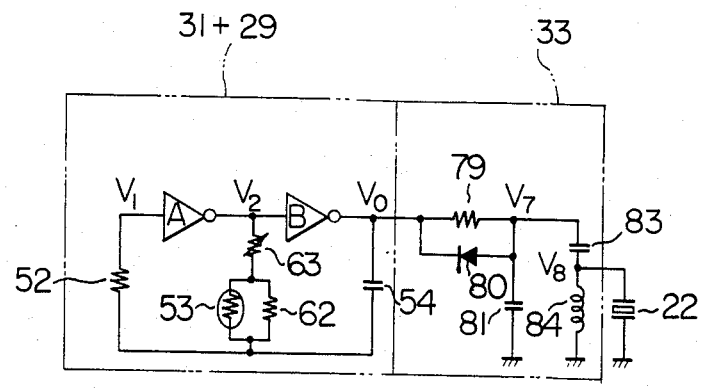
FIG. 13 is a diagram showing another embodiment of a specific circuit of the probe.

This pulse oscillator circuit, with a transmission drive circuit and an ultrasonic wave oscillator element added thereto, is shown in FIGS. 11 and 13. In FIGS. 11 and 13, the thermistor section of the oscillator circuit is as shown. Specifically, the thermistor 29 is connected in parallel to a fixed resistor 62 and in series with a semi-fixed resistor 63 which provides an adjusting point for compensating for the variations of the circuit constants.

The thermistor 29 is connected in parallel to the fixed resistor 62 for the reason mentioned below.

The resistance value $R_{TH}$ of the thermistor 29 is generally given as $$R_{TH} = R_{25} \exp \left\{ B \cdot \left( \frac{1}{T} - \frac{1}{T_{25}} \right) \right\} \qquad (2)$$

where $R_{25}$ is the resistance value of the thermistor 29 at 25° C., B is a constant, T a measuring temperature (°K.) and $T_{25}$ is the absolute temperature K equivalent to 25° C.

It is seen from equation (2) that the resistance value of the thermistor with $R_{25}$ of 40 K$\Omega$ at 25° C. and the constant B of 3970° K. changes with the temperature exponentially.

If the thermistor 29 is replaced directly by the resistor 53 of FIG. 9, therefore, the resistance value undergoes a great change with the temperature of 0° to 100° C. exponentially. In order to reduce the variation of the resistance value and in order for the resistance to change linearly, a fixed resistor 62 is inserted in parallel.

The output voltage $V_0$ of the oscillator circuit is differentiated by the capacitor 66 and the resistor 67 through the inverter C. The output thus differentiated is further connected to an LC series resonance circuit through the inverter 69, and an ultrasonic oscillator element 22 is connected in parallel to the coil 72. The differentiator circuit and the inverter circuit are for effecting the transmission only at the rise point of the output $V_0$. The resonance frequency f of the LC series resonance circuit is expressed as $$f = \frac{1}{2\pi \sqrt{L_1 C_1}} \text{ (Hz)} \qquad (3)$$

where $C_2$ is the capacitance of the capacitor 71 and $L_1$ is the inductance of the coil 72.

The value of the resonance frequency f is thus determined to coincide with the natural frequency of the ultrasonic oscillator element 22 by determining the values of $L_1$ and $C_2$ appropriately, and the ultrasonic oscillator element 22 is connected in parallel to the coil 72 with high frequency current supplied to improve the transmission efficiency.

Figure 12A:
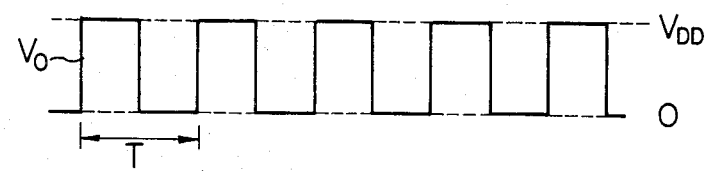
FIGS. 12a, 12b, 12c, 12d and 12e show voltage waveforms produced at various points in FIG. 11.
Figure 12B:
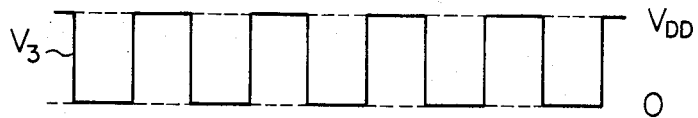
Figure 12C:
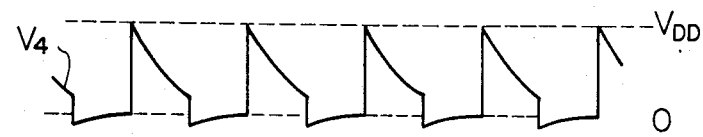
Figure 12D:
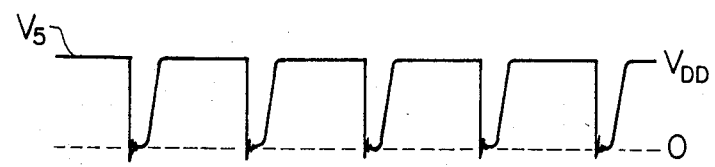
Figure 12E:
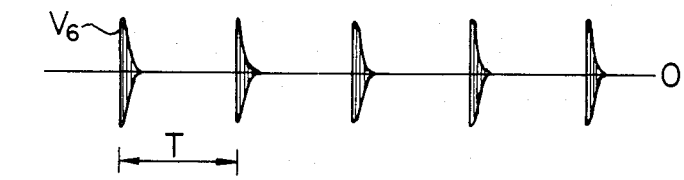

The voltage waveforms at various points of the circuit of FIG. 11 are shown in FIGS. 12a to 12e, in which FIG. 12a represents a rectangular output voltage waveform of the oscillator circuit, FIG. 12b is a voltage waveform obtained through an inverter, FIG. 12c shows a voltage waveform differentiated, FIG. 12d is a voltage waveform obtained from the differentiated waveform through the inverter connected with the LC series resonance circuit, and FIG. 12e a voltage waveform applied to the ultrasonic oscillator element 22. From these waveforms, it is seen that the signal having the period T of the output voltage waveform $V_0$ of the oscillator circuit is transmitted from the ultrasonic oscillator element 22.

Figure 14A:
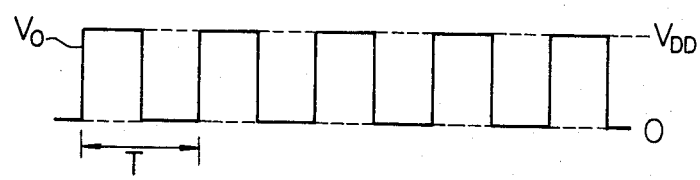
FIGS. 14a, 14b and 14c are diagrams showing voltage waveforms produced at various points in FIG. 13.
Figure 14B:
Figure 14C:
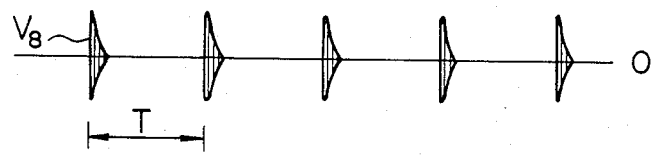

Another embodiment of the transmission circuit is shown in FIG. 13. The oscillator circuit included in FIG. 13 is similar to the one described above. This transmission circuit is such that the oscillator circuit is connected with an integrator circuit to make the rise of the rectangular wave gentle and the series resonance circuit is operated at the fall point thereof for ultrasonic wave transmission. The output of the oscillator circuit is connected to an RC integrator circuit, and the resistor 79 is connected in parallel with a diode 80 reversely. By so doing, the rise of the rectangular wave, and hence the charging curve of the capacitor 81 and the resistor 79 becomes gentle on account of the high impedance of the diode 80. The time constant involved is given as $\tau = C_3 R_4$ where $C_3$ is the capacitance of the capacitor 81 and $R_4$ the resistance of the resistor 79. At the time of fall that is discharge, on the other hand, the diode 80 is directed forward and the impedance is low so that the discharge is rapidly effected. FIGS. 14a to 14c show the voltage waveforms produced by this circuit, in which FIG. 14a shows an output waveform of the oscillator circuit, FIG. 14b a waveform of the output voltage $V_7$ of the integrator circuit, and FIG. 14c a voltage waveform applied to the ultrasonic oscillator element 22. The circuit such as this is thus capable of transmitting the signal of period T of the oscillator circuit.

Figure 15:
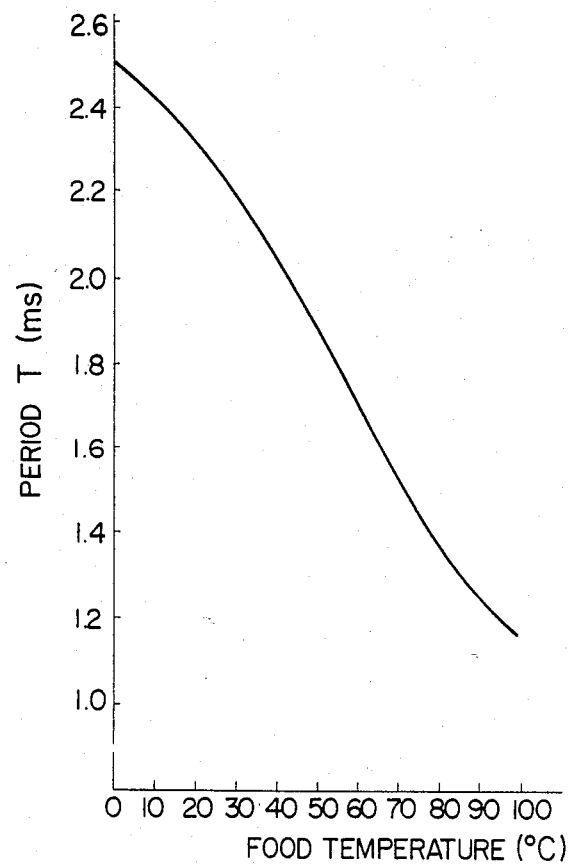
FIG. 15 is a diagram showing the relation between the temperature of the object to be heated and the pulse oscillation period of the probe.

The relation between the temperature of the object to be heated and the oscillation period of the probe will be described with reference to FIG. 15. The characteristics illustrated in this diagram are based on the constants of the oscillator circuit of the probe including the resistance value of 200 KΩ of the resistor 52, the resistance of 6 KΩ of the resistor 63, the resistance of 15 KΩ of the resistor 62, the capacitance of 0.047 μF of the capacitor 54, and the DC source voltage $V_{DD}$ of 6 V.

Although this characteristic curve is not linear in the strict sense of the word, no practical problem is posed in detecting the temperature. The oscillation period T is approximately 2.5 ms at 0° C. and 1.18 ms at 100° C. and involves a low frequency.

In this system, the oscillation period of the probe depends solely on the thermistor so that if the oscillation period is greatly changed by the temperature rise of the oscillator circuit or the fluctuations of the source voltage or the variations of the parts, it is impossible to accurately grasp the temperature of the object. The oscillation period, therefore, should desirably remains unchanged against the environmental conditions.

Figure 16:
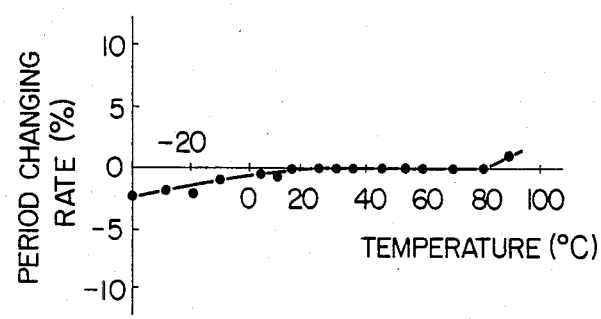
FIG. 16 is a measurement showing the relation between the ambient temperature and the changing rate of the pulse oscillation period with a thermistor used as a fixed resistor.

FIG. 16 shows actual measurements of the changing rate of the oscillation period with the probe oscillation period at the ambient temperature of 20° C. as a reference while maintaining the resistance of the thermistor 29 constant and changing the ambient temperature of the probe from −40° to 90° C. This characteristic indicates that the fluctuation of the oscillation period is as low as 1° to 2° C. in terms of temperature against the ambient temperature change. The change of the period of the transmitter circuit due to the ambient temperature does not pose any roadblock to the temperature detection of the object to be heated.

Figure 17:
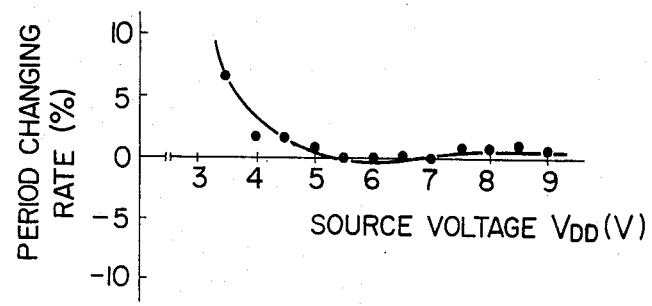
FIG. 17 is a measurement showing the relation between the change of the source voltage and the changing rate of the pulse oscillation period with a thermistor used as a fixed resistor.

FIG. 17 shows measurements of the changing rate of the oscillation period based on the theoretical oscillation period at the ambient temperature of 20° C. with the resistance of the thermistor 29 maintained constant while changing the source voltage $V_{DD}$ in the range from DC 3 to 9 V. It can be said that the period substantially remains unchanged when the source voltage $V_{DD}$ higher than 5 V is used. This is due to the fact that, as explained with reference to FIG. 9, the resistance ratio $R_S/R_T$ is high. When the source voltage $V_{DD}$ is lower than 4 V, on the other hand, the period increases; when the voltage is lower than 3 V, no oscillation occurs. The increase of the period for the source voltage lower than 4 V is probably explained by the fact that the output current of the inverter of the oscillation circuit is reduced thereby to change the inclination of the charge and discharge of the capacitor 54 and the thermistor 29.

In the system where the high frequency in the heating chamber is received by an antenna, rectified and used as a power supply for the oscillator and transmitter circuits, the source voltage changes with the position of the probe on the turn table. The source voltage thus may drop below DC 5 V, with the result that the changing rate of the oscillation period increases and the oscillation period tends to lengthen. If an algorithm is prepared for picking up the minimum period as a positive signal in the receiving system, the problem encountered in the low voltage is solved. The voltage higher than 9 V, by contrast, does not pose any problem if a Zener diode is used for the power circuit.

As described above, the probe oscillator circuit, which is adversely affected very little by the ambient temperature change or the change of the source voltage, is capable of picking up the temperature of the object accurately.

The receiving end will be explained below.

Figure 18:
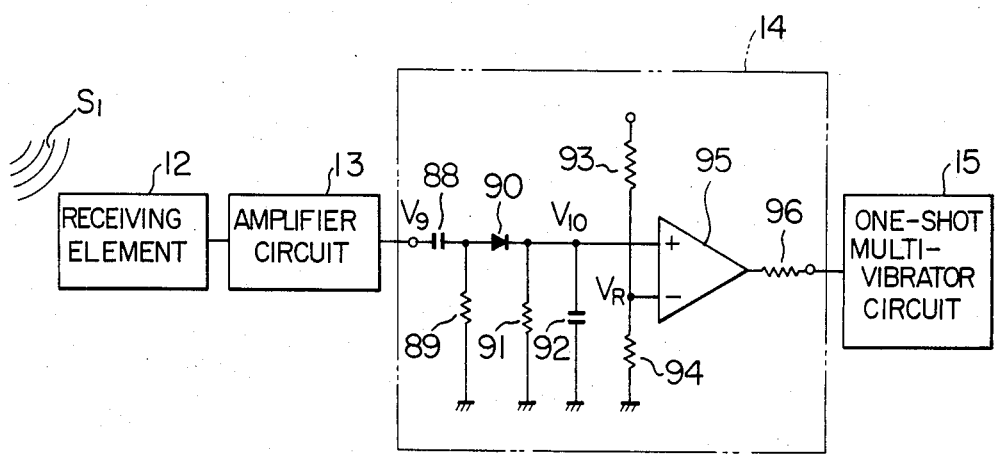
FIG. 18 is a diagram showing a pulse waveform-producing circuit for rectifying an amplified received signal and producing a pulse waveform by use of a comparator circuit with a reference voltage fixed.
Figure 19:
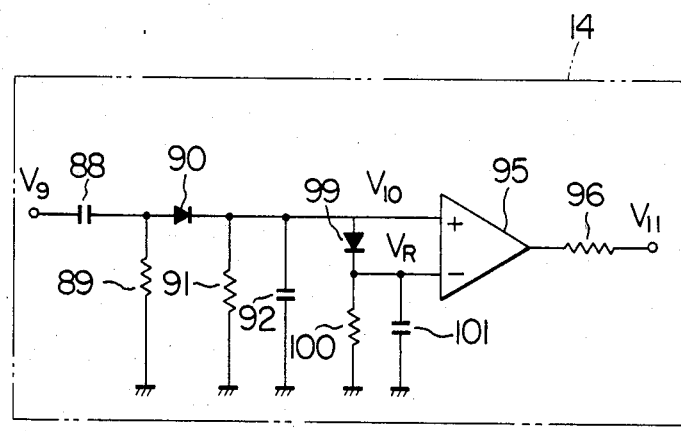
FIG. 19 is a diagram showing a pulse waveform-producing circuit similar to the one shown in FIG. 18, in which the reference voltage of the comparator is changed with the signal.
Figure 20A:
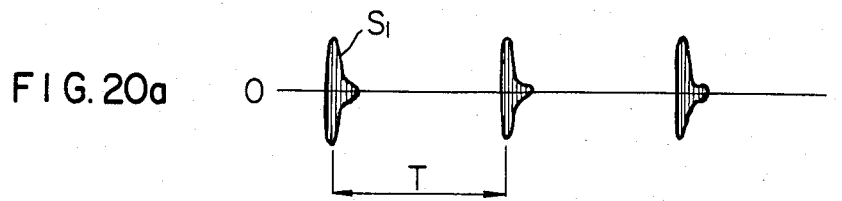
FIGS. 20a, 20b, 20c and 20d show the signal voltage waveform of the probe and voltage waveforms produced at various points in FIG. 19 in the case where the probe is provided in proximity to a receiving element.
Figure 20B:
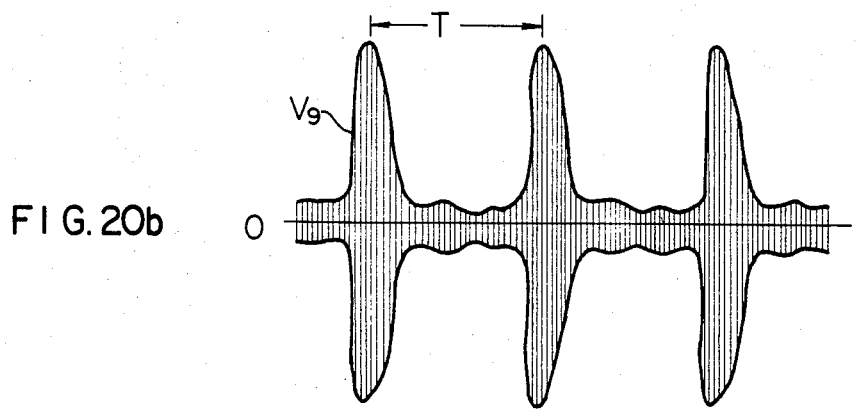
Figure 21A:
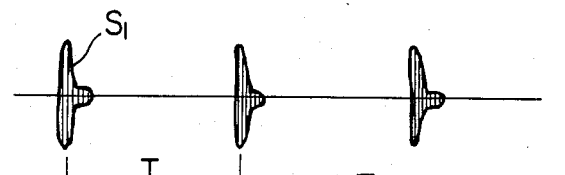
FIGS. 21a, 21b, 21c, 21d are diagrams similar to FIGS. 20a to 20d, showing similar waveforms in the case where the probe is disposed distant from a receiving element.
Figure 21B:
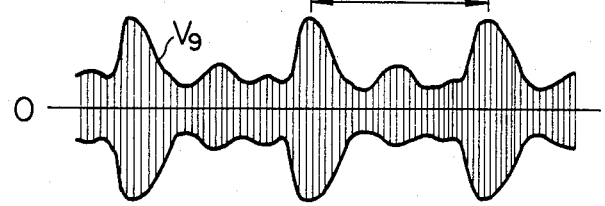

The signal received by the ultrasonic wave receiving element mounted on the outside of the wall of the heating chamber is amplified by an operational amplifier or the like. A couple of waveform shaping circuits for producing a pulse waveform from the amplified signal is shown in FIGS. 18 and 19. FIG. 18 shows a common waveform shaping circuit, in which the amplified signal is cut at the DC portion by the capacitor 88 to produce a signal as shown in FIGS. 20b and 21b. This signal is rectified at the diode 90 and the resistor 91, and the carrier component of the signal is removed by the capacitor 92, followed by the application thereof to the positive terminal (+) of the comparator 95. A reference voltage $V_R$, on the other hand, is applied to one terminal of the comparator 95 at the constant voltage determined by the ratio between the resistors 93 and 94. In this circuit, the comparator A is actuated and the output thereof is raised to high level (state) "H" when the signal voltage $V_{10}$ exceeds the reference voltage $V_R$, while when the signal voltage $V_{10}$ is reduced below the reference voltage $V_R$, the output of the comparator A is lowered to low level (stage) "L" thereby to produce a rectangular wave.

This circuit, however, has the disadvantage that when the received signal is weak, the signal voltage $V_{10}$ is smaller than the reference voltage $V_R$ so that the transmitted signal is liable to fail to be picked up and that when the reference voltage $V_R$ is reduced, the echo of the ultrasonic wave is likely to cause a rectangular wave of shorter period than the normal signal.

FIG. 19 shows a waveform shaping circuit which obviates the above-mentioned disadvantages. The features of the circuit according to this embodiment are that:

(1) The reference voltage of the comparator 95 is reduced from the convex shaped signal voltage by the voltage drop across the diode 99 thereby to turn on the comparator 95.

(2) The reference voltage $V_R$ is changed with the level change of the signal voltage.

The use of this circuit permits, more normal temperature signals to be picked up than the circuit of FIG. 18, thereby improving the temperature-measuring accuracy.

In FIG. 19, the signal voltage $V_{10}$, which is similar to the signal voltage $V_{10}$ in FIG. 18, is applied to the positive terminal of the comparator 95. The reference voltage $V_R$ is applied to a negative terminal of the comparator 95. This reference voltage $V_R$ is rendered lower than the signal voltage $V_{10}$ by the voltage drop across the diode 99, held at the capacitor 101 and discharged through the resistor 100. A germanium diode low in voltage drop is suitably used as the diode 99. The voltage drop across the diode 99 is required in order that the peak value of the voltage $V_R$ of the capacitor 101 and the resistor 100 may be reduced below the peak value of the signal voltage $V_{10}$ and thus the signal voltage $V_{10}$ crosses the reference voltage $V_R$ for actuating the comparator 95. On the other hand, the product of the capacitance of the capacitor 101 and the resistance of the resistor 100 that is the discharge time constant is determined in such way that the peak value of the reference voltage $V_R$ is capable of following the change of the peak value of the received signal $V_{10}$, that is, the intensity of the received signal.

Figure 20C:
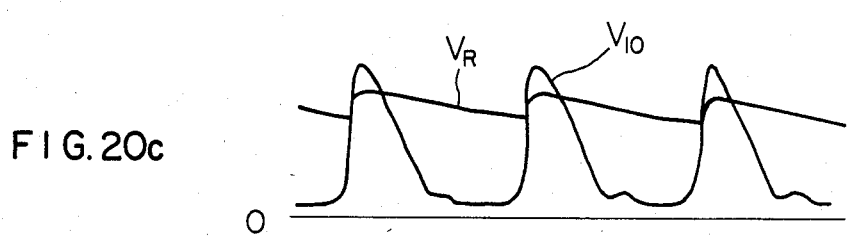
Figure 20D:
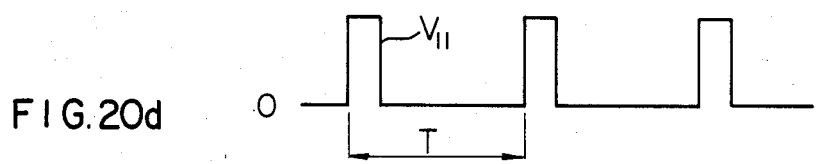

The effect of the circuit under consideration will be explained with reference to FIGS. 20a to 20d and 21a to 21d. FIGS. 20a to 20d show waveforms shaped when the ultrasonic received signal $S_1$ is strong, in which FIG. 20a shows a waveform S applied to the transmitter element of the probe, and FIG. 20b a signal waveform $V_9$ obtained by amplifying the received signal and cutting off the DC portion thereof at the capacitor 88. When the source voltage of the receiving circuit is 10 V and the amplification factor of the amplifier circuit is 80 dB, this signal voltage is about 4 $V_{P-P}$. This signal $V_9$ is rectified and the carrier component thereof is removed by the capacitor 92, with the result that the signal voltage $V_{10}$ shown in FIG. 20c is obtained. A reference voltage lower than the signal voltage $V_{10}$ by the voltage drop across the diode 99 and obtained by charge and discharge is shown in FIG. 20c. In FIG. 20c, the output of the comparator 95 becomes "H" and a pulse waveform of the period T is produced when the signal voltage $V_{10}$ exceeds the reference voltage $V_R$.

Figure 21C:
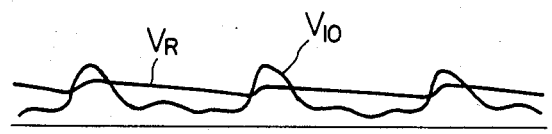
Figure 21D:
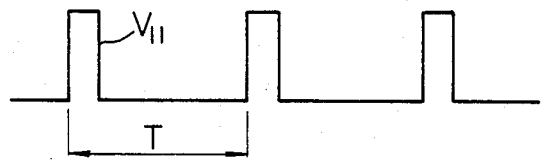

Signal waveforms shaped when the received signal $S_1$ is weak are shown in FIGS. 21a to 21d. FIG. 21b shows a voltage waveform after the capacitor 88, which stands at about 1 $V_{P-P}$. FIG. 21c shows voltage waveforms of the signal voltage $V_{10}$ and the reference voltage $V_R$. These drawings indicate that when the signal voltage $V_{10}$ is higher than the reference voltage $V_R$, the comparator 95 is actuated so that the output thereof is raised to "H" state thereby to produce the transmission period of the probe.

This circuit configuration has the advantage that even when the ultrasonic received signal is weak, the transmitted signal is securely picked up even with the probe positioned laterally, thus enlarging the applications thereof.

The output of the waveform shaping circuit is applied to the one-shot multivibrator circuit 15 for waveform shaping.

Figure 22:
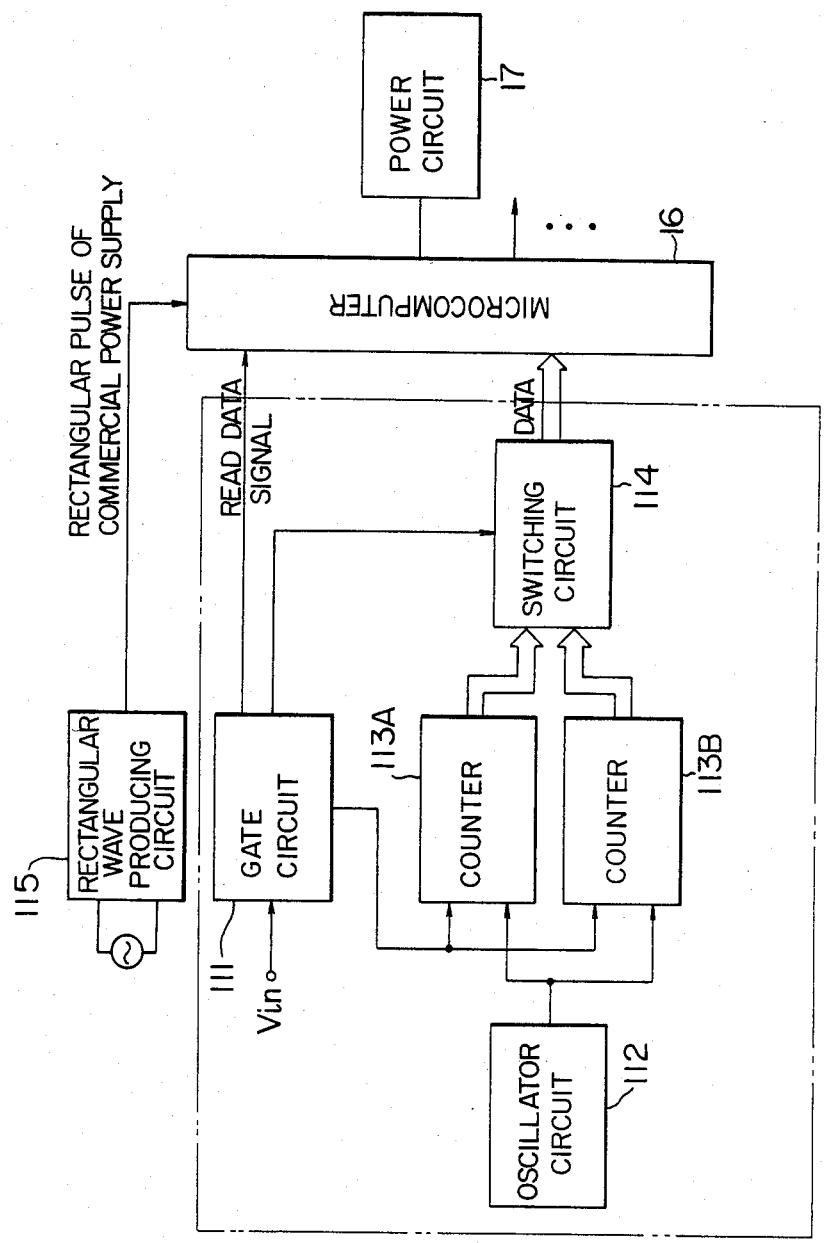
FIG. 22 is a block diagram of an I/O interface circuit for counting the period of a pulse train as a temperature data and applying the data to a microcomputer.

Now, the I/O interface circuit for reading the temperature signal of period T at the microcomputer 16 will be explained with reference to the block diagram of FIG. 22.

The signal with the waveform thereof shaped is applied to the block 111 comprised of a gate. This block 111 produces a pulse signal for switching the counter output on the basis of the temperature signal and a pulse signal for reading the count (temperature data) at the microcomputer 16. Numeral 112 designates a block for oscillating a fixed frequency for counting the temperature signal of period T. This oscillator circuit 112 has an oscillation frequency stable against the environmental conditions, and includes an oscillator such as crystal oscillator. The oscillation period T' of this oscillator circuit 112 is shorter than T. In the case where the period T' is very small as compared with T, the temperature-measuring accuracy is improved, but only up to a certain value due to the variations of the received signal.

A pair of counters 113A and 113B are provided in two rows for the purpose of counting the pulse trains of the temperature signal of period T alternately. The counters 113 and 113B are connected to the integrated circuits 114 for switching the output thereof in response to the two input pulses. The output signals of the counters 113A and 113B are alternately switched at the switching circuit 114 and applied to the microcomputer 16. A switching pulse signal is prepared at the gate circuit 111.

The block 115 is for producing a rectangular wave from the commercial power supply and the output signal thereof is applied to the microcomputer 16.

The pulse of the commercial power supply is applied to the microcomputer for the purpose of reading the temperature data only when the commercial power supply is "L", on account of the fact that when the commercial power supply is "H", the ultrasonic transmitter element of the probe is adversely affected by the high frequency radiated into the heating chamber.

The microcomputer 16 has such functions as processing the data, indicating the temperature, and when the object to be heated reaches the temperature set by the user, applying a signal to a circuit for controlling the power circuit of the magnetron according to a program.

A general flowchart for reading and processing the data of this wireless temperature probe system is shown in FIG. 23. The feature of this flowchart lies in that as mentioned above, during the "L" state of the commercial power supply pulse when the high frequency is not radiated into the heating chamber, the first read data signal rises, and the data is read at the time of the second rise, and that the data is processed when the commercial power supply pulse becomes "H". FIGS. 24a to 24d show time charts, in which FIG. 24a represents a rectangular pulse of commercial power supply, FIG. 24b the read data signal, FIG. 24c the signal of counting oscillation frequency, and FIG. 24d the data read by the microcomputer 16.

In FIGS. 24a to 24d, at least two data are read in a period of the power supply pulse, which does not present any practical problem in temperature detection.

In the flowchart, the data processing is such that, for instance, the frequency distribution of a predetermined number of data read is taken, and the value representing the peak thereof is employed as the temperature data (detected temperature). When the detected temperature is determined by the data processing, it is compared with the temperature set by the user, and when the set temperature is reached, the magnetron 18 is controlled thereby to inform the user by alarm or the like.

Apart from the outside view and a sectional view of the wireless temperature probe according to an embodiment shown in FIGS. 4a and 4b respectively, an outside view and a sectional view of a probe according to another embodiment are shown in FIGS. 25a and 25b respectively.

The construction of the probe 9, as described with reference to FIGS. 4a to 4b, is such that a receiving antenna 121 is provided under the probe 9 and covered with a plastic material 122 of heat-resistant silicon to function also as a stopper of the probe inserted into the object to be heated.

Figure 26:
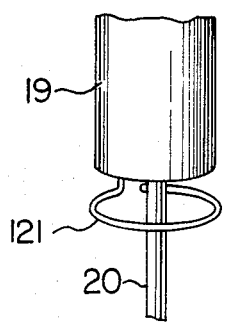
FIG. 26 is a partial outside view of a loop antenna shown in FIGS. 25a and 25b.
Figure 27:
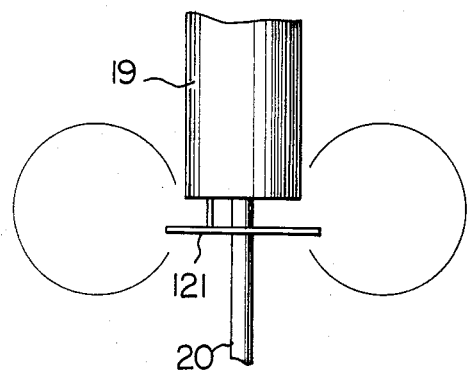
FIG. 27 is a diagram showing an electric field directivity pattern of the loop antenna of FIGS. 25a and 25b.

The antenna 121, on the other hand, is constructed in such a way that, as shown in FIG. 26, a loop antenna with the axis thereof positioned on the protrusion 20 of the probe has an end thereof connected to the strip line 36 and the other end connected to the probe body 19. The loop antenna such as this is coaxial due to the central conductor and facilitates the concentration of the electric field. A pattern diagram of the directivity of electric field of the loop antenna is shown in FIG. 27. The directivity covers all the directions around the antenna 121 and wide in range, thus making the antenna operation stable for obtaining a source voltage. In the diagram, the ultrasonic wave oscillator element is protected from the high frequency of the heating chamber by a metal plate punched with holes 120.

Means of mounting the ultrasonic wave receiving element in the transmission-receiving system using ultrasonic wave as a medium will be described below.

Figure 28A:
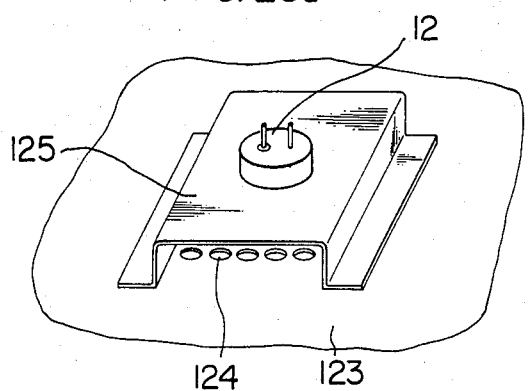
FIGS. 28a and 28b are a perspective view and a sectional view respectively showing a construction in which a receiving element is mounted through a hole punched in the wall of the heating chamber.
Figure 28B:
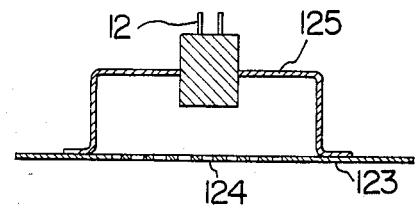

FIG. 28a shows a construction in which holes are punched or meshes are formed at part of the wall of the heating chamber, and through these holes or meshes, the ultrasonic wave receiving element is fixed on a support rest. A sectional view of this construction is shown in FIG. 28b. The punched holes or meshes have the function to reject the high frequency of the heating chamber and pass the ultrasonic wave. The amount of the ultrasonic wave thus passed is greater, the greater the opening rate of the punched holes or meshes respectively. The meshes larger in opening rate, however, has the disadvantage that water drips, oil or chips of the object to be heated are liable to attach thereto and the resulting clogged meshes reflect the ultrasonic wave. In a construction intended to obviate these shortcomings, the punched holes or the meshes, as the case may be, are coated with a chemical substance adapted to reject water and oil, or wind or hot air is supplied to prevent the clogging.

The ultrasonic wave receiving element is desirably located in proximity to the wall provided with the punched holes or meshes, as the case may be, in order to heighten the received signal level and broaden the directivity of the receiving element.

Figure 29:
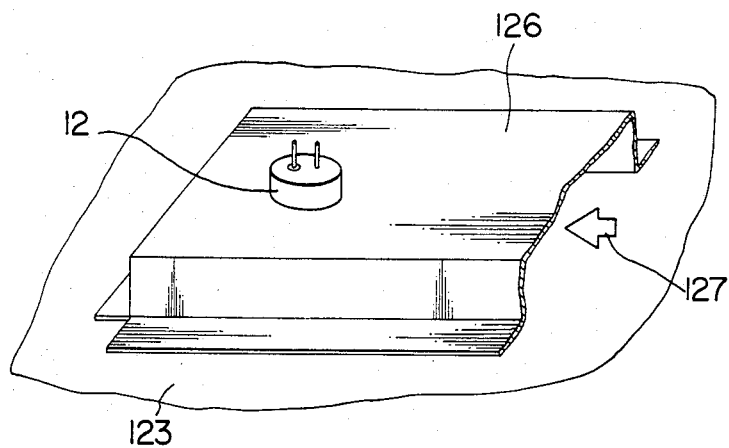
FIG. 29 is a perspective view showing a construction in which a receiving element is mounted on a guide to supply the air.

Another construction of the assembly is shown in FIG. 29, in which the support rest of the ultrasonic wave receiving element of FIGS. 28a and 28b has a wind guide and the cooling air for the magnetron is supplied in the direction of arrow to prevent the punched holes or meshes from clogging. What may be considered a problem of this construction is the probable effect of the wind on the ultrasonic wave signal. Although the waveform of the received signal is slightly disturbed at the wind velocity of about 10 m/sec, however, the period thereof remains unchanged and therefore no problem is posed.

Aside from the above-mentioned construction using punched holes or meshes, still another method of construction in which the ultrasonic wave receiving element is mounted without any punched holes or meshes will be described. In this construction free of punched holes or meshes, measures for preventing the clogging caused by water drips or contamination are not required, thus leading to the advantage of a high receiving efficiency. The problem, however, is the leakage of radio wave.

Figure 30:
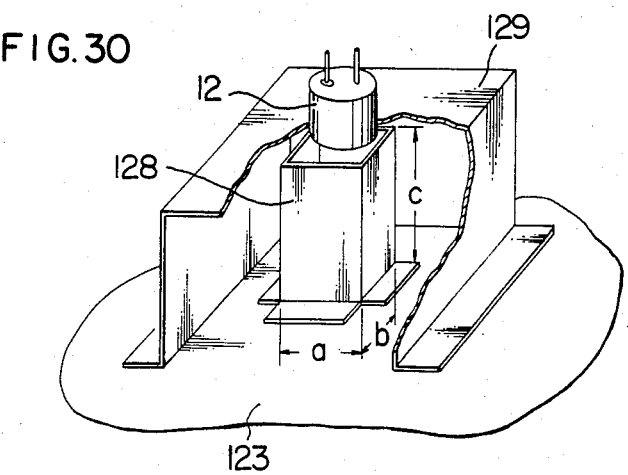
FIG. 30 is a perspective view showing a receiving element mounted through a cutoff waveguide.

In FIG. 30, the wall of the heating chamber is partly cut-out, and a cut-off wave guide having an opening in registration with the window of the heating chamber wall is provided. On the upper part of this wave guide, a supporting rest for the ultrasonic wave receiving element is located to fixedly carry the element. As shown in the diagram, the wave guide has an opening size of a by b and the length of c. Generally, let the free space wavelength of the high frequency in the wave guide be $\lambda$, the wavelength in the guide be $\lambda g$, and the cut-off wavelength be $a_c$. The advancing radio wave exp $(-j\beta gl)$ will be described. $\beta g$ designates a phase constant, and is given as $\beta g = 2\pi/\lambda g$. l is the distance in the forward direction of radio wave in the wave guide. Then the wavelength in the wave guide is expressed as $$\lambda g = \frac{1}{\sqrt{1 - \left(\frac{\lambda}{\lambda_c}\right)^2}} \qquad (4)$$

$$\lambda_c = 2a \qquad (5)$$

From equation (4) above, if $\lambda_c$ is smaller than $\beta$, $j\beta g$ is a positive real number, so that the radio wave is attenuated exponentially in positive direction of l and fails to propagate. Specifically, description will be made of a waveguide in which a=b=10 mm and c=30 mm. Generally, the frequency of the operating radio wave of the high frequency heating apparatus is 2450 MHz, and therefore $\lambda$ takes the value of 122.45 mm. Taking the value of $\lambda$ as 20 mm from equation (5), $\lambda g$ is calculated from equation (4) to obtain $j\beta g$ Thus $\beta g$ is 0.31. The advancing wave is exp $(-0.3 l1)$. Substituting l=30 mm in this, the attenuation rate is 40 dB in power. The leakage of the high frequency is considerably reduced and has no effect.

This is also the case with a circular cylindrical wave guide which may replace the cut-off wave guide of a rectangular cylindrical material shown in FIG. 30.

Figure 31A:
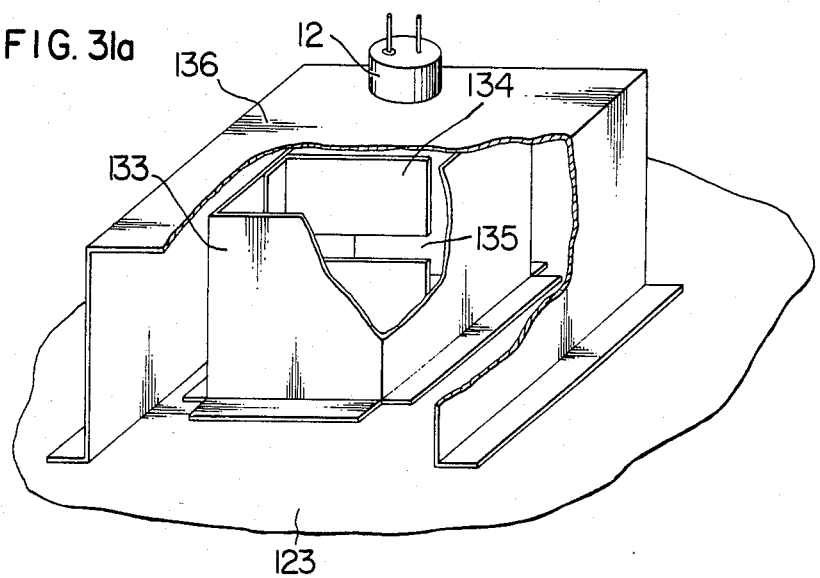
FIGS. 31a and 31b are a perspective view and a sectional view respectively of a receiving element mounted through a band rejection filter.

Still another embodiment using a band rejection filter will be described. A perspective view of such a construction is shown in FIG. 31a in partially cutaway form. A hole about 30 mm on each side is cut out in part of the wall of the heating chamber, and a metal cylinder 133 about 30 mm tall with an opening equal to or slightly larger than the hole is provided thereon. The length of 30 mm is about one fourth of the operating wavelength of the high frequency. At the central part of the metal cylinder 133, a conductor plate 134 with a slit is securely disposed substantially vertically to form a band rejection filter. A supporting rest is fixed above this filter, and fixedly carries the ultrasonic wave receiving element 12.

Figure 31B:
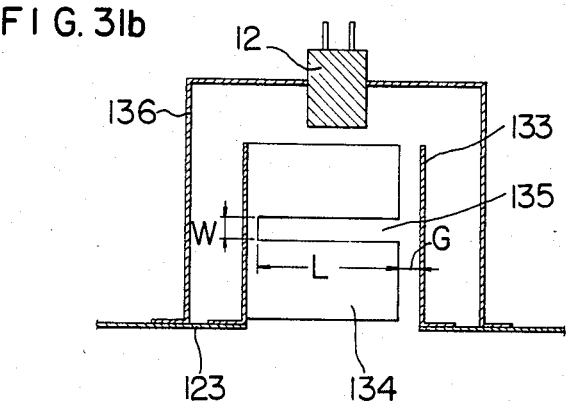

A sectional view of the assembly along the surface of the conductor plate 134 with a slit of FIG. 31a is shown in FIG. 31b. The slit of the conductor plate is as wide as 5 mm to prevent the discharge in the strong electric field of the high frequency. The gap G between the metal cylinder 133 and the conductor plate 134 also has a width of about 5 mm to prevent discharge. If the length L of the slit is made about one fourth of the free space wavelength of the operating radio wave (high frequency), then the high frequency is capable of being attenuated by 70 to 80 dB thereby to comply with the regulations of the radio wave leakage.

The signals from the probe can be received without any interference by fixedly mounting the ultrasonic wave receiving element through the construction as described above.

What is claimed is:

1. A high frequency heating apparatus with a wireless temperature probe, comprising:
   a. a heating chamber for containing an object to be heated;
   b. high frequency power supply means for supplying high frequency power into said heating chamber thereby to heat said object housed in said heating chamber;
   c. a power supply circuit section for receiving the high frequency power supplied into said heating chamber from said high frequency power supply means at an appropriate position in said heating chamber and rectifying said high frequency power thereby to provide a DC power supply, a temperature-measuring section including a thermistor for sensing the temperature of the inside of said object to be heated, an oscillator circuit section for oscillating at a frequency determined by a time-constant capacitor and the resistance value of said thermistor of said temperature-measuring section, an ultrasonic wave transmitter section driven by said oscillator circuit section for transmitting an ultrasonic wave, and casing means for protecting said power supply circuit section, said temperature measuring section, said oscillator circuit section and said ultrasonic wave transmitter section from the strong electric field of high frequency in said heating chamber, said power supply circuit including a rectifying diode and strip lines, said strip lines including a main line for conducting the high frequency in said high frequency heating chamber, shorting lines for forming an electric wave shorting plane at the position of said rectifying diode, and a DC feedback line for passing the rectified DC power, the main line being about λg/2 long, the shorting lines and the DC feedback line being λg/4 long where λg is the wavelength of the high frequency on the strip lines;
   d. an ultrasonic wave receiving section mounted on the wall of said heating chamber and protected from the strong electric field of high frequency in said heating chamber for receiving the ultrasonic wave transmitted from said ultrasonic wave transmitter section contained in said casing means;
   e. signal processing means for deciding the temperature of said object on the basis of the ultrasonic wave signal received at said ultrasonic wave receiving section; and
   f. control means for controlling the operation of said high frequency power supply means on the basis of the signal from said signal processing means.

2. An apparatus according to claim 1, wherein said power supply circuit is shielded by a metal plate thereby to protect the transmitter circuit from a high-frequency field to be produced on said power supply circuit.

3. An apparatus according to claim 1 wherein said power supply circuit supplies the DC power obtained by the rectifying function of said rectifying diode, via a feedthrough capacitor to the transmitter circuit.

4. An apparatus according to claim 1, wherein said DC feedback line, said main line and said shorting lines of the strip lines are wider in that order.

5. An apparatus according to claim 1, wherein said shorting lines include a pair of shorting strip lines of the same shape arranged in parallel to each other in order to increase the shorting effect thereof.

6. An apparatus according to claim 1, wherein an end of said DC feedback strip line is shorted to the ground side of a strip line base plate by a conductor by way of a through hole formed in said strip line base plate.

7. An apparatus according to claim 1, wherein said oscillator circuit includes inverter circuits, a resistor, said capacitor and a thermistor.

8. An apparatus according to claim 7, wherein the oscillation frequency of said oscillator circuit depends on the resistance value of said thermistor.

9. An apparatus according to claim 7, wherein said oscillator circuit is driven by a voltage not lower than 5 V.

10. An apparatus according to claim 1, wherein said transmitter section includes capacitors and coils making up a series resonance circuit, the resonance frequency thereof being rendered to coincide with the resonance frequency of a drip-proof ultrasonic wave transmitter element thereby to transmit the oscillation frequency of said oscillator circuit.

11. An apparatus according to claim 1, wherein said casing means includes a conductor of metal.

12. An apparatus according to claim 1, wherein said casing means included a hole punched at the portion thereof in proximity to said transmitter element.

13. An apparatus according to claim 1, wherein said ultrasonic wave receiving section mounted on the wall of said heating chamber is securely mounted through selected one of a cut-off wave guide, a wave guide having a band rejection filter, a punched hole in the heating chamber wall, or meshes in the heating chamber wall.

14. An apparatus according to claim 1, wherein said signal processing means is means for producing a rectangular pulse waveform from the ultrasonic received signal amplified and rectified, thereby picking up the oscillation frequency of said oscillator circuit.

15. An apparatus according to claim 14, wherein said rectangular pulse waveform is produced by a comparator circuit, the reference voltage of which changes with the level of said rectified signal.

16. An apparatus according to claim 15, wherein a terminal of said comparator circuit is supplied with said rectified signal, said signal being further applied to the other terminal of said comparator circuit through a diode as a reference voltage, said reference voltage being reduced by the voltage drop across said diode from the peak voltage value of said rectified signal thereby to actuate said comparator circuit.

17. An apparatus according to claim 16, wherein the other terminal of said comparator circuit is grounded through a capacitor and a resistor in parallel, thereby to charge and discharge the voltage dropped by said diode.

18. An apparatus according to claim 17, wherein the time constant of said charge-discharge circuit of said capacitor and resistor is larger than the oscillation period of said oscillator circuit.

19. An apparatus according to claim 14, wherein said means for picking up the oscillation period of said oscillator circuit measures the time from the leading edge of said rectangular pulse waveform to the next leading edge thereof by clock signal.

20. An apparatus according to claim 14, wherein said time is measured during the period that the high frequency power is not applied.

21. An apparatus according to claim 14, wherein said means for picking up the signal of the oscillation period of said oscillator circuit measure the time from the leading edge of said rectangular pulse waveform to the next leading edge thereof by clock signal, and said control means includes a microcomputer for turning off said high frequency power supply means on the basis of the signal of said signal processing means.

22. A high frequency heating apparatus with a wireless temperature probe, comprising:
  a. a heating chamber for containing an object to be heated;
  b. high frequency power supply means for supplying high frequency power into said heating chamber thereby to heat said object housed in said heating chamber;
  c. a power supply circuit section for receiving the high frequency power suppled into said heating chamber from said high frequency power supply means at an appropriate position in said heating chamber and rectifying said high frequency power thereby to provide a DC power supply, a temperature-measuring section including a thermistor for sensing the temperature of the inside of said object to be heated, an oscillator circuit section for oscillating at a frequency determined by a time-constant capacitor and the resistance value of said thermistor of said temperature-measuring section, an ultrasonic wave transmitter section driven by said oscillator circuit section for transmitting an ultrasonic wave, and casing means for protecting said power supply circuit section, said temperature measuring section, said oscillator circuit section and said ultrasonic wave transmitter section from the strong electric field of high frequency in said heating chamber, said power supply circuit including a rectifying diode and strip lines, said strip lines including a main line for conducting the high frequency in said high frequency heating chamber, shorting lines for forming an electric wave shorting plane at the position of a rectifying diode, and a DC feedback line for passing the rectified DC power, the main line being about $\lambda g/2$ long, the shorting lines and the DC feedback line being $\lambda g/4$ long where $\lambda g$ is the wavelength of the high frequency on said strip lines, an end of said DC feedback line being shorted to the ground side of the strip line base plate by a conductor by way of a through hole formed in said strip line base plate, said ground side being provided on the back of said strip line base plate and making up part of a metal plate for shielding said power supply circuit;
  d. an ultrasonic wave receiving section mounted on the wall of said heating chamber and protected from the strong electric field of high frequency in said heating chamber for receiving the ultrasonic wave transmitted from said ultrasonic wave transmitter section contained in said casing means;
  e. signal processing means for deciding the temperature of said object on the basis of the ultrasonic wave signal received at said ultrasonic wave receiving section; and
  f. control means for controlling the operation of said high frequency power supply means on the basis of the signal from said signal processing means.

* * * * *